US009799144B2

(12) United States Patent
Kimura et al.

(10) Patent No.: US 9,799,144 B2
(45) Date of Patent: Oct. 24, 2017

(54) HEAD MOUNTED DISPLAY, AND CONTROL METHOD FOR HEAD MOUNTED DISPLAY

(71) Applicant: SEIKO EPSON CORPORATION, Tokyo (JP)

(72) Inventors: Fusashi Kimura, Matsumoto (JP); Keiichi Okano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 177 days.

(21) Appl. No.: 14/607,556

(22) Filed: Jan. 28, 2015

(65) Prior Publication Data
US 2015/0279110 A1 Oct. 1, 2015

(30) Foreign Application Priority Data

Mar. 27, 2014 (JP) ................. 2014-065100

(51) Int. Cl.
G06T 19/00 (2011.01)
G02B 27/01 (2006.01)
G06F 3/01 (2006.01)
G02B 27/00 (2006.01)

(52) U.S. Cl.
CPC ........ *G06T 19/006* (2013.01); *G02B 27/0093* (2013.01); *G02B 27/017* (2013.01); *G06F 3/012* (2013.01); *G02B 2027/0178* (2013.01); *G02B 2027/0187* (2013.01)

(58) Field of Classification Search
None
See application file for complete search history.

(56) References Cited

U.S. PATENT DOCUMENTS

| 6,320,559 | B1 | 11/2001 | Yasukawa et al. | |
| 8,606,645 | B1* | 12/2013 | Applefeld | G06Q 30/02 705/14.25 |
| 8,866,849 | B1* | 10/2014 | Cho | G02B 27/0172 345/629 |
| 2012/0050143 | A1* | 3/2012 | Border | G09G 3/3611 345/8 |

FOREIGN PATENT DOCUMENTS

JP   3872100 B2   1/2007

* cited by examiner

*Primary Examiner* — James A Thompson
(74) *Attorney, Agent, or Firm* — Oliff PLC

(57) ABSTRACT

A head mounted display which allows a user to visually recognize a virtual image, includes an image display unit that enables the user to visually recognize the virtual image, a display processing unit that causes the image display unit to form the virtual image indicating a plurality of images used to operate the head mounted display and a background image, and a motion detection unit that detects a motion of the head of the user. The display processing unit changes the background image according to a motion of the head of the user.

11 Claims, 16 Drawing Sheets

| ICON IMAGE 60a  | (xa, ya)<br>COORDINATES OF<br>ICON IMAGE 60a | /sdcard/android/data/XXXa<br>LINK DESTINATION OF<br>ICON IMAGE 60a |
|---|---|---|
| ICON IMAGE 60b  | (xb, yb)<br>COORDINATES OF<br>ICON IMAGE 60b | /sdcard/android/data/XXXb<br>LINK DESTINATION OF<br>ICON IMAGE 60b |
| ICON IMAGE 60c  | (xc, yc)<br>COORDINATES OF<br>ICON IMAGE 60c | /sdcard/android/data/XXXc<br>LINK DESTINATION OF<br>ICON IMAGE 60c |
| ICON IMAGE 60d  | (xd, yd)<br>COORDINATES OF<br>ICON IMAGE 60d | /sdcard/android/data/XXXd<br>LINK DESTINATION OF<br>ICON IMAGE 60d |
| ⋮ | ⋮ | ⋮ |

FIG. 7

HEAD MOUNTED DISPLAY, AND CONTROL METHOD FOR HEAD MOUNTED DISPLAY

BACKGROUND

1. Technical Field

The present invention relates to a head mounted display.

2. Related Art

A head mounted display is known which is mounted on the head of a user to be used and forms a virtual image in a visual field region of the user.

In such a head mounted display, there is a technique called virtual reality in which a virtual image which is visually recognized by a user is changed in tracking of a motion or the like of the user's head so that a virtual space is presented. In the virtual space which is realized by using the head mounted display, since a visually recognized virtual image is changed according to a motion of the user, the user can obtain a high immersive feeling in which the user directly observes the virtual space with his/her own eyes. Japanese Patent No. 3872100 discloses a head mounted display in which virtual screens serving as operation units are disposed at different positions of a virtual display screen, and one of the operation units (virtual screens) is visually recognized by the user according to a motion of the user's head.

In the technique disclosed in Japanese Patent No. 3872100, there is a problem in that the user visually recognizes a completely different operation unit (virtual screen) according to a motion of the user's head, and thus it is hard to obtain an immersive feeling.

For this reason, a head mounted display is desirable which provides an operation unit for operating the head mounted display to a user and enables the user to have an immersive feeling into a virtual space. In addition, in the head mounted display, miniaturization, achievement of low cost, saving of resources, simplification of manufacturing, convenience of use, and the like are desirable.

SUMMARY

An advantage of some aspects of the invention is to solve at least a part of the problems described above, and the invention can be implemented as the following forms.

(1) An aspect of the invention provides a head mounted display which allows a user to visually recognize a virtual image. The head mounted display includes an image display unit that enables the user to visually recognize the virtual image; a display processing unit that causes the image display unit to form the virtual image indicating a plurality of images used to operate the head mounted display and a background image; and a motion detection unit that detects a motion of the head of the user, in which the display processing unit changes the background image according to a motion of the head of the user. According to the head mounted display of the aspect, the display processing unit causes the image display unit to form the virtual image indicating a plurality of images used to operate the head mounted display and the background image, and thus the user visually recognizes the virtual image. For this reason, the display processing unit can provide an operation unit for operating the head mounted display to the user. Since the display processing unit changes a background image according to a motion of the head of the user, the user can have an immersive feeling into a virtual space due to the background image which is changed according to the motion of the head of the user. As a result, it is possible to provide a head mounted display which provides an operation unit for operating the head mounted display to a user and enables the user to have an immersive feeling into a virtual space.

(2) In the head mounted display according to the aspect described above, the display processing unit may extract part of a target image from the target image having a region larger than a region of the background image, and sets the extracted target image as the background image, and may change the background image by changing a portion extracted from the target image according to a motion of the head of the user. According to the head mounted display of the aspect, since the display processing unit changes a portion extracted as the background image from the target image according to a motion of the head of the user, the display processing unit can cause a background image to be continuously changed. Therefore, the user can have a high immersive feeling.

(3) In the head mounted display according to the aspect described above, the display processing unit may move a portion extracted as the background image from the target image in a horizontal direction according to a detected horizontal motion of the head of the user, and may move a portion extracted as the background image from the target image in a vertical direction according to a detected vertical motion of the head of the user. According to the head mounted display of the aspect, the display processing unit moves a portion extracted as the background image from the target image in a horizontal direction according to a horizontal motion of the head of the user, and moves a portion extracted as the background image from the target image in a vertical direction according to a vertical motion of the head of the user. As mentioned above, the display processing unit changes a background image in tracking of a motion of the head of the user, and thus the user can have a high immersive feeling.

(4) The head mounted display according to the aspect described above may further include a storage unit that stores in advance a movement amount of the head of the user in the horizontal direction relative to a horizontal size of the target image and a movement amount of the head of the user in the vertical direction relative to a vertical size of the target image. The display processing unit may determine a portion to be extracted as the background image from the target image, on the basis of a detected horizontal motion of the head of the user, the movement amount in the horizontal direction, a detected vertical motion of the head of the user, and the movement amount in the vertical direction. According to the head mounted display of the aspect, the display processing unit determines a portion to be extracted as the background image from the target image, on the basis of the movement amounts in the horizontal and vertical directions of the head of the user stored in the storage unit, and detected horizontal and vertical motions of the head of the user. For this reason, content of the storage unit is changed, and thus a process of the display processing unit can be easily changed.

(5) In the head mounted display according to the aspect described above, the display processing unit may incline a portion extracted as the background image from the target image according to an oblique motion of the head of the user. According to the head mounted display of the aspect, the display processing unit inclines a portion extracted as the background image from the target image according to an oblique motion of the head of the user. As mentioned above, the display processing unit changes a background image in tracking of a motion of the head of the user, and thus the user can have a high immersive feeling.

(6) In the head mounted display according to the aspect described above, the display processing unit may change the target image according to the current time. According to the head mounted display of the aspect, since the display processing unit changes the target image according to the current time, the user can have a high immersive feeling.

(7) The head mounted display according to the aspect described above may further include a storage unit that stores characteristic conditions regarding characteristics of the target image in advance. The display processing unit may acquire an original image which is a source of the target image, may generate the target image which satisfies the characteristic conditions by converting the original image in a case where the acquired original image does not satisfy the characteristic conditions, and may set the original image as the background image without conversion in a case where the acquired original image satisfies the characteristic conditions. According to the head mounted display of the aspect, the display processing unit generates the target image which satisfies the characteristic conditions by converting the original image which is a source of the target image in a case where the acquired original image does not satisfy the characteristic conditions regarding characteristics of the target image. For this reason, characteristics of the target image used to generate a background image can be uniformized.

(8) The head mounted display according to the aspect described above may further include a storage unit that stores generation conditions regarding generation of the target image in advance. The display processing unit may acquire an original image which is a source of the target image, and may generate the target image by converting the acquired original image according to the generation conditions. According to the head mounted display of the aspect, the display processing unit generates the target image by converting the acquired original image which is a source of the target image according to the generation conditions regarding characteristics of the target image. For this reason, characteristics of the target image used to generate a background image can be uniformized.

(9) The head mounted display according to the aspect described above may further include a visual line detection unit that detects a visual line of the user. The display processing unit may change the background image according to a visual line of the user. According to the head mounted display of the aspect, the display processing unit changes the background image according to a visual line of the user. For this reason, the user can have a higher immersive feeling into a virtual space due to a background image which is changed according to a change in a visual line of the user in addition to a motion of the head of the user.

(10) The head mounted display according to the aspect described above may further include an attitude detection unit that detects an attitude of the user. The display processing unit may change the background image according to an attitude of the user. According to the head mounted display of the aspect, the display processing unit changes the background image according to an attitude of the user. For this reason, the user can have a higher immersive feeling into a virtual space due to a background image which is changed according to a change in an attitude of the user in addition to a motion of the head of the user.

(11) In the head mounted display according to the aspect described above, the plurality of images may include at least icon images in the head mounted display. According to the head mounted display of the aspect, the plurality of images may include icon images for activating applications installed in the head mounted display.

All of the plurality of constituent elements in the respective aspects of the invention described above are not essential, and some of the plurality of constituent elements may be changed, deleted, exchanged with other new constituent elements, and partially deleted from limited content thereof, as appropriate, in order to solve some or all of the above-described problems or in order to achieve some or all of the effects described in the present specification. In addition, in order to solve some or all of the above-described problems or in order to achieve some or all of the effects described in the present specification, some or all of the technical features included in one aspect of the invention described above may be combined with some or all of the technical features included in another aspect of the invention described above, and as a result may be treated as an independent aspect of the invention.

For example, one aspect of the invention may be implemented as a device which includes some or all of the three constituent elements including the image display unit, the display processing unit, and the motion detection unit. In other words, this device may or may not include the image display unit. The device may or may not include the display processing unit. The device may or may not include the motion detection unit. This device may be implemented as, for example, a head mounted display, but may be implemented as devices other than the head mounted display. Some or all of the above-described technical features of each aspect of the head mounted display are applicable to the device.

The invention may be implemented in various aspects, and may be implemented in aspects such as a head mounted display, a control method for the head mounted display, a head mounted display system, a computer program for implementing functions of the method, the display, and the system, and a recording medium for recording the computer program thereon.

BRIEF DESCRIPTION OF THE DRAWINGS

The invention will be described with reference to the accompanying drawings, wherein like numbers reference like elements.

FIG. 7 is a diagram illustrating an example of icon example.

DESCRIPTION OF EXEMPLARY EMBODIMENTS

A. First Embodiment

A-1. Configuration of Head Mounted Display

Figure 1:
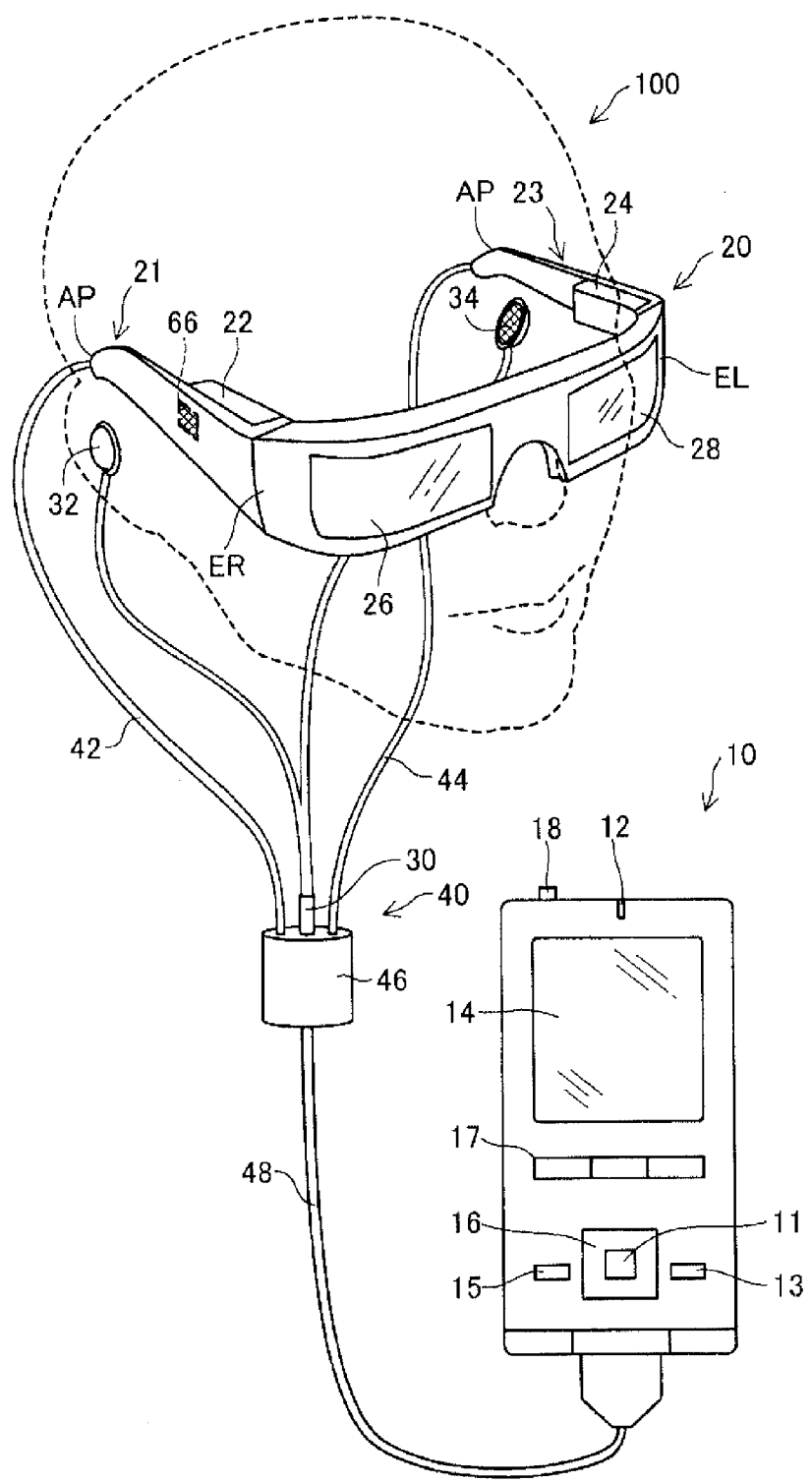
FIG. 1 is a diagram illustrating a schematic configuration of a head mounted display according to a first embodiment of the invention.

FIG. 1 is a diagram illustrating a schematic configuration of a head mounted display according to an embodiment of the invention. A head mounted display 100 is a display mounted on the head, and is hereinafter also simply referred to as an HMD 100. The HMD 100 according to the present embodiment is an optical transmission type head mounted display which allows a user to visually recognize a virtual image and also to directly visually recognize external scenery. The HMD 100 of the present embodiment performs a user interface (UI) display process described later so that the user visually recognizes a virtual image indicating an image in which a plurality of images (for example, icon images) used to operate the HMD 100 are superimposed on a background image. In the HMD 100 of the present embodiment, the background image can be changed according to a motion of the user's head.

The HMD 100 includes an image display section 20 which allows the user to visually recognize a virtual image in a state of being mounted on the head of the user, and a control section 10 (a controller) which controls the image display section 20. In the following description, for convenience, a virtual image which is displayed by the HMD 100 and is visually recognized by the user is also referred to as a "displayed image". In addition, emitting image light on the basis of image data is also referred to "displaying an image".

The image display section 20 is a mounting body which is mounted on the head of the user, and has a glasses shape in the present embodiment. The image display section 20 includes a right holding unit 21, a right display driving unit 22, a left holding unit 23, a left display driving unit 24, a right optical image display unit 26, a left optical image display unit 28, and a nine-axis sensor 66. The right optical image display unit 26 and the left optical image display unit 28 are disposed so as to be located in front of the eyes of the user when the user wears the image display section 20. One end of the right optical image display unit 26 and one end of the left optical image display unit 28 are connected to each other at the position corresponding to the glabella of the user when the user wears the image display section 20.

The right holding unit 21 is a member which is provided so as to extend over a position corresponding to the temporal region of the user from an end part ER which is the other end of the right optical image display unit 26 when the user wears the image display section 20. Similarly, the left holding unit 23 is a member which is provided so as to extend over a position corresponding to the temporal region of the user from an end part EL which is the other end of the left optical image display unit 28 when the user wears the image display section 20. The right holding unit 21 and the left holding unit 23 hold the image display section 20 on the head in the same manner as temples of glasses.

The right display driving unit 22 is disposed inside the right holding unit 21, that is, on a side opposing the head of the user when the user wears the image display section 20. The left display driving unit 24 is disposed inside the left holding unit 23. Hereinafter, the right holding unit 21 and the left holding unit 23 are collectively simply referred to as "holding units", the right display driving unit 22 and the left display driving unit 24 are collectively simply referred to as "display driving units", and the right optical image display unit 26 and the left optical image display unit 28 are collectively simply referred to as "optical image display units".

The display driving units include liquid crystal displays (hereinafter, referred to as an "LCD") 241 and 242, projection optical systems 251 and 252, and the like (refer to FIG. 2). Details of configurations of the display driving units will be described later. The optical image display units as optical members include light guide plates 261 and 262 (refer to FIG. 2) and dimming plates. The light guide plates 261 and 262 are made of light transmissive resin material or the like and guide image light which is output from the display driving units to the eyes of the user. The dimming plate is a thin plate-shaped optical element, and is disposed to cover a surface side (an opposite side to the user's eye side) of the image display section 20. The dimming plate protects the light guide plates 261 and 262 so as to prevent the light guide plates 261 and 262 from being damaged, polluted, or the like. In addition, light transmittance of the dimming plates is adjusted so as to adjust an amount of external light entering the eyes of the user, thereby controlling an extent of visually recognizing a virtual image. The dimming plate may be omitted.

The nine-axis sensor 66 is disposed at a position corresponding to the right temple of the user when the user wears the image display section 20. The nine-axis sensor 66 is a motion sensor which detects acceleration (in three axes), angular velocity (in three axes), and geomagnetism (in three axes). The nine-axis sensor 66 is provided in the image display section 20, and thus functions as a motion detection unit which detects a motion of the head of the user when the image display section 20 is mounted on the head of the user. Here, the motion of the head includes velocity, acceleration, angular velocity, direction, and change of direction.

The image display section 20 includes a coupling unit 40 which couples the image display section 20 to the control section 10. The coupling unit 40 has a main body cord 48 connected to the control section 10, a right cord 42 and a left cord 44 into which the main body cord 48 branches, and a connection member 46 provided at the branch point. The right cord 42 is inserted into a casing of the right holding unit 21 from a tip end AP of the right holding unit 21 in the extending direction, and is coupled to the right display driving unit 22. Similarly, the left cord 44 is inserted into a casing of the left holding unit 23 from a tip end AP of the left holding unit 23 in the extending direction, and is coupled to the left display driving unit 24. The connection member 46 is provided with a jag for coupling to an earphone plug 30. A right earphone 32 and a left earphone 34 extend from the earphone plug 30.

The image display section 20 and the control section 10 transmit various signals via the coupling unit 40. An end of the main body cord 48 on an opposite side to the connection member 46 and the control section 10 are respectively provided with connectors (not illustrated) fitted to each other. The control section 10 and the image display section 20 are coupled to or decoupled from each other through fitting or unfitting between the connector of the main body cord 48 and the connector of the control section 10. As the right cord 42, the left cord 44, and the main body cord 48, for example, a metal cable or an optical fiber may be used.

The control section 10 is a device which controls the HMD 100. The control section 10 includes a determination key 11, a lighting unit 12, a display change key 13, a track pad 14, a luminance change key 15, a direction key 16, a menu key 17, and a power switch 18. The determination key 11 detects a pressing process and outputs a signal for determining content which is operated in the control section 10. The lighting unit 12 performs a notification of an operation state of the HMD 100 by using its light emitting state. An operation state of the HMD 100 includes, for example, On and Off of a power supply. For example, a light emitting diode (LED) is used as the lighting unit 12. The display change key 13 detects a pressing operation and outputs a signal for changing a content moving image display mode between 3D and 2D.

The track pad 14 detects an operation of the finger of the user on the operation surface of the track pad 14 and outputs a signal corresponding to detected content. As a detection type of the track pad 14, various types such as an electrostatic type, a pressure detection type, and an optical type may be employed. The luminance change key 15 detects a pressing operation and outputs a signal for changing luminance of the image display section 20. The direction key 16 detects a pressing operation on a key corresponding to upper, lower, left, and right directions, and outputs a signal corresponding to detected signal. The power switch 18 detects a sliding operation of the switch, and changes a power supply state of the HMD 100.

Figure 2:
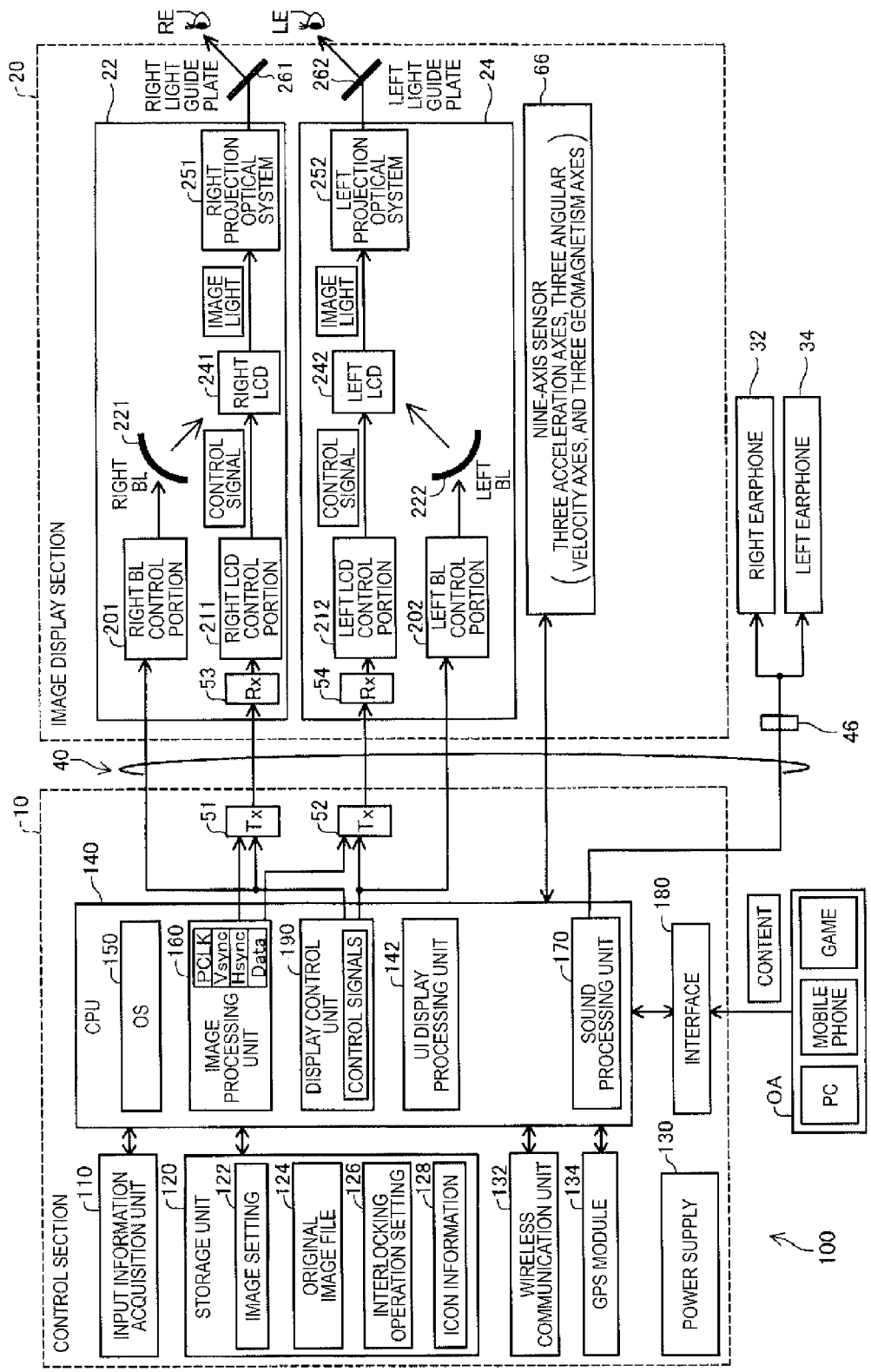
FIG. 2 is a functional block diagram illustrating a configuration of the HMD.

FIG. 2 is a functional block diagram illustrating a configuration of the HMD 100. The control section 10 includes an input information acquisition unit 110, a storage unit 120, a power supply 130, a wireless communication unit 132, a CPU 140, an interface 180, and transmission units (Tx) 51 and 52, which are coupled to each other via a bus (not illustrated).

The input information acquisition unit 110 acquires a signal based on an operation input which is performed on the determination key 11, the display change key 13, the track pad 14, the luminance change key 15, the direction key 16, the menu key 17, and the power switch 18. The input information acquisition unit 110 may acquire an operation input by using various methods other than the above description. For example, an operation input may be acquired by using a foot switch (a switch operated by the leg of the user). In addition, for example, an operation input based on a visual line detected by a visual line detection unit 62 or an operation input based on a command correlated with a motion of the visual line may be acquired. This command may be set to be added by a user. For example, a gesture of a user may be detected by using a camera which captures an image in a visual field direction of the user, and an operation input based on a command correlated with the gesture may be acquired. When the gesture is detected, a finger tip of the user, a ring worn by the user, a medical tool held with the user's hand, or the like may be used as a marker for detecting a motion. If an operation input can be acquired by using the foot switch or a visual line, the input information acquisition unit 110 can acquire an operation input from a user even for work in which it is difficult for the user to remove his/her hands.

The storage unit 120 is constituted by a ROM, a RAM, a DRAM, a hard disk, and the like. The storage unit 120 stores various computer programs including an operating system (OS). The storage unit 120 stores an image setting 122, an original image file 124, an interlocking operation setting 126, and icon information 128.

Figure 3:
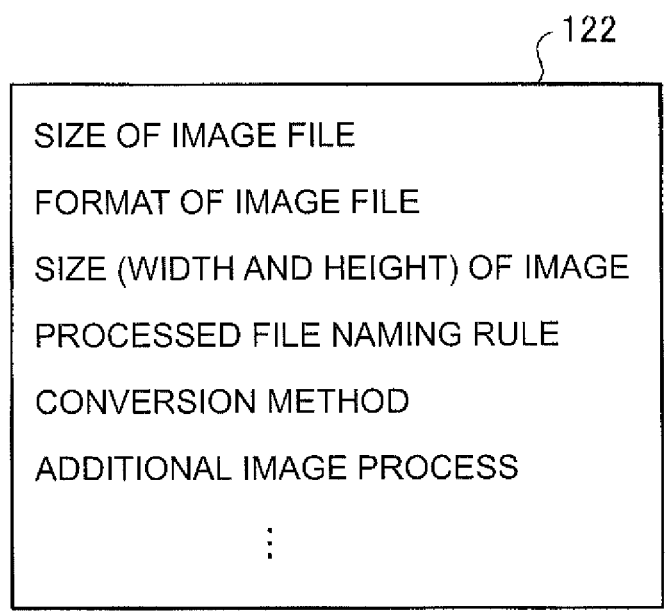
FIG. 3 is a diagram illustrating an example of an image setting.

FIG. 3 is a diagram illustrating an example of the image setting 122. The image setting 122 is used to generate a target image from an original image during a UI display process described later. Here, the "original image" is an image given by the user of the HMD 100. The "target image" indicates an image which is an extraction source of a "background image" on which a plurality of images (for example, icon images) used to operate the HMD 100 are superimposed. Characteristic conditions regarding characteristics of the target image and generation conditions regarding generation of the target image are stored in the image setting 122 in advance. In addition, content of the image setting 122 may be added, deleted, and changed by the user.

The characteristic conditions regarding characteristics of the target image include, for example, a size of an image file, a format of the image file, and a size (a width and a height) of an image. At least one of an upper limit value, a lower limit value, and a combination of the upper limit value and the lower limit value of a file size recommended as a size (the number of bytes) of an image file of the target image is stored in the size of the image file. A format recommended as a data recording method of the image file of the target image, for example, JPEG or GIF is stored in the format of the image file. At least one of an upper limit value, a lower limit value, and a combination of the upper limit value and the lower limit value recommended as the number of pixels of the target image in a width direction and a height direction is stored in the size of the image.

The generation conditions regarding generation of the target image include, for example, a processed file naming rule, a conversion method, and an additional image process. A naming rule of the image file of the target image generated in the UI display process described later is stored in the processed file naming rule. In the file naming rule, a file name may be expressed by using, for example, a regular expression. A conversion method which is performed in the UI display process and in which an original image is converted into a target image is stored in the conversion method. The conversion method includes "designation of a process to be performed" such as an enlargement or reduction process or a cutting process, and a specific method (3-lobed Lanczos-windowed sinc interpolation, a pixel averaging method, or the like) in a corresponding process. The additional image process is a process which is additionally performed on a target image generated in the UI display process. As the additional image process, for example, gamma correction, luminance correction, contrast correction, noise removal, or contour emphasis may be employed.

Figure 4:
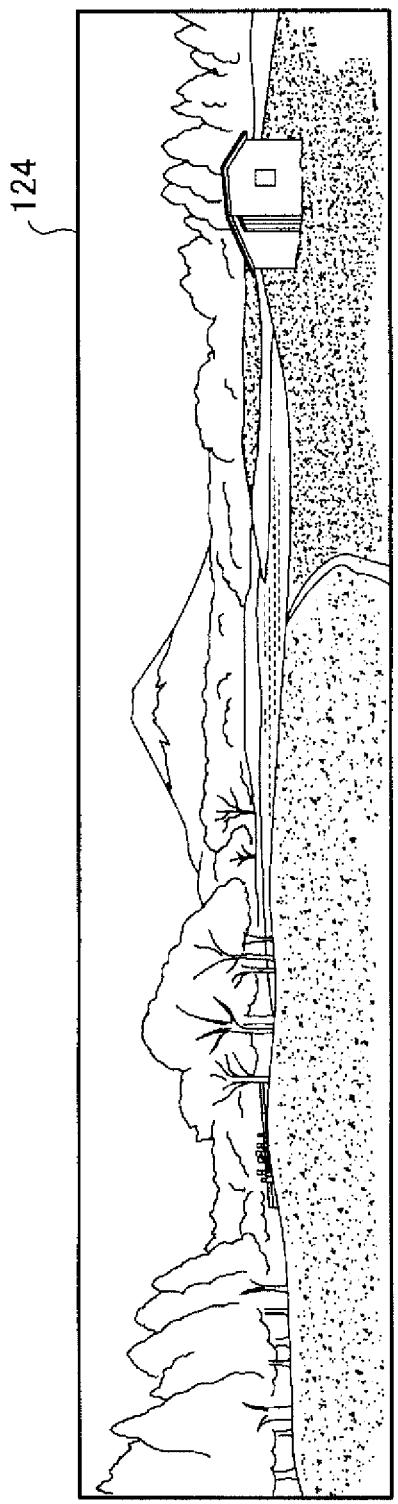
FIG. 4 is a diagram illustrating an example of an image indicated by an original image file given by a user of the HMD.

FIG. 4 is a diagram illustrating an example of an image indicated by the original image file 124 given by the user of the HMD 100. In the example of FIG. 4, the image (hereinafter, referred to as an "original image") indicated by the original image file 124 is a panoramic picture in which a flower garden is drawn on a lower side, a forest is drawn on the left side, Mt. Fuji is drawn at the center, and a cabin is drawn on the right side.

Figure 5:
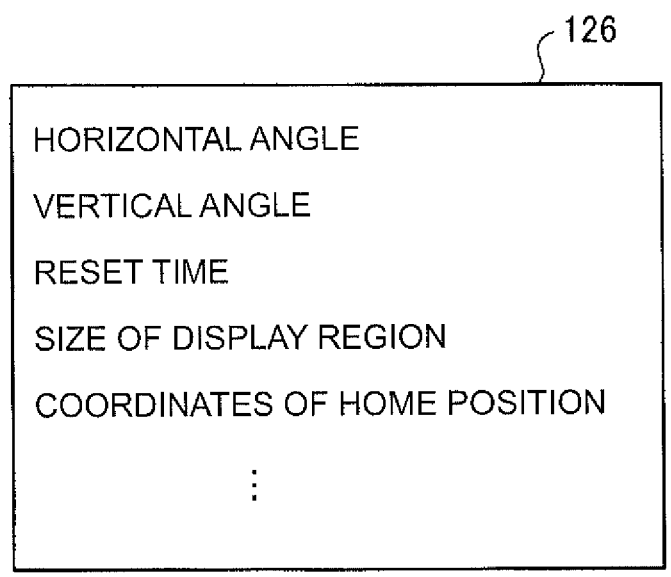
FIG. 5 is a diagram illustrating an example of an interlocking operation setting.

FIG. 5 is a diagram illustrating an example of the interlocking operation setting 126. The interlocking operation setting 126 is used to change a background image according to a motion of the head of the user in the UI display process described later. The interlocking operation setting 126 stores a horizontal angle, a vertical angle, a reset time, a size of a display region, and home position coordinates in advance. In addition, content of the interlocking operation setting 126 may be added, deleted, and changed by the user.

Figure 6:
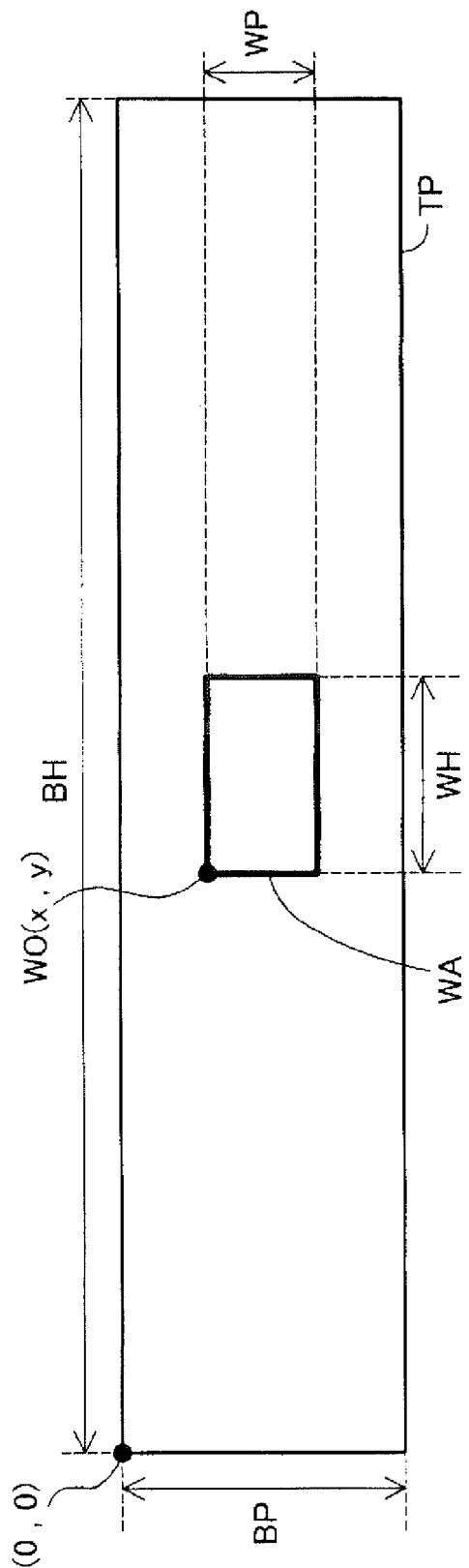
FIG. 6 is a diagram for explaining the interlocking operation setting.

FIG. 6 is a diagram for explaining the interlocking operation setting 126. For convenience of illustration, in FIG. 6, a target image TP is illustrated as a white image. The horizontal angle of the interlocking operation setting 126 stores a movement amount of the user's head in the horizontal direction corresponding to a size BH of the target image TP in the horizontal direction. For example, in a case where "360 degrees" is stored in the horizontal angle, in the UI display process described later, if a movement amount of the head in the horizontal direction is 360 degrees, the background image is moved by the same amount as the size BH of the target image TP in the horizontal direction. The vertical angle stores a movement amount of the user's head in the vertical direction corresponding to a size BP of the target image TP in the vertical direction. For example, in a case where "45 degrees" is stored in the vertical direction, in the UI display process, if a movement amount of the head in the vertical direction is 45 degrees, the background image is moved by the same amount as the size BP of the target image TP in the vertical direction. In order to minimize a data amount of the target image TP and an increase in a processing load of the UI display process and also to provide a virtual space which does not give discomfort to the user, the horizontal angle is preferably 360 degrees, and the vertical angle is preferably 45 degrees to 90 degrees, and is more preferably 90 degrees.

The reset time stores the time when the moved background image is returned to a home position in the UI display process described later. The size of a display region stores a size WP in the vertical direction and a size WH in the horizontal direction of a region which is extracted from the target image TP as a "background image". Hereinafter, this region is also referred to as a "background image region WA". In FIG. 6, the background image region WA is indicated by a thick frame. A size of the background image region WA is smaller than a size of the target image TP. A predetermined point (for example, the upper left end) of the target image TP is set to the origin (0,0), and coordinates WO at an initial arrangement position of the background image region WA is defined as a movement amount (x,y) and is stored in the home position coordinates.

FIG. 7 is a diagram illustrating an example of the icon information 128. The icon information 128 is used when icon images are superimposed on a background image in the UI display process described later. The icon information 128 stores icon images 60, coordinates 70 of the icon images, and link destinations 80 of the icon images in advance.

The icon images 60 are a set of images which are normally displayed on a so-called "standby screen" of the OS 150 of the HMD 100. The icon images include images for activating applications installed in the HMD 100, images drawn by widgets or gadgets installed in the HMD 100, images (for example, a folder image, a short-cut image, and a thumbnail image) for activating data stored in the HMD 100, and the like. In the example of FIG. 7, the icon images 60 include an icon image 60a for activating an application of a camera, an icon image 60b for activating an application of an SNS, an icon image 60c for activating an application of a speaker, and an icon image 60d for activating an application of a mail service. It can be said that the respective icon images 60a to 60d are images forming an operation unit for operating the HMD 100.

The coordinates 70 of icon images are a set of coordinates for identifying positions where the icon images 60a to 60d are disposed in the standby screen of the OS 150 of the HMD 100. The coordinates 70 of the icon images are defined and stored as a movement amount (x,y) of a central position of an icon image relative to an origin when a predetermined point (for example, the upper left end) of the standby screen of the HMD 100 is set to the origin (0,0). The link destinations 80 of the icon images are a set of link destinations (in other words, file paths of execution files) of execution files of applications linked to the icon images 60a to 60d. In addition, in a case where an icon image is an image for activating data stored in the HMD 100, a link destination of the icon image is a link destination (in other words, a file path of the data) of the data.

In FIG. 2, the power supply 130 supplies power to each unit of the HMD 100. For example, a secondary battery may be used as the power supply 130. The wireless communication unit 132 performs wireless communication with other apparatuses in accordance with a predetermined wireless communication standard such as a wireless LAN or Bluetooth.

The CPU 140 reads and executes the computer programs stored in the storage unit 120 so as to function as the OS 150, an image processing unit 160, a sound processing unit 170, a display control unit 190, and a UI display processing unit 142. The UI display processing unit 142 performs a UI display process so as to function as a "display processing unit" which provides a user interface.

The image processing unit 160 generates signals on the basis of content (video) which is input via the interface 180 or the wireless communication unit 132. In addition, the image processing unit 160 supplies the generated signals to the image display section 20 via the coupling unit 40. The signals supplied to the image display section 20 differ in cases of an analog format and a digital format. In a case of the analog format, the image processing unit 160 acquires an image signal included in content, separates a synchronization signal such as a vertical synchronization signal VSync or a horizontal synchronization signal HSync, and generates a clock signal PCLK by using a PLL circuit or the like in accordance with a cycle of the signal. The image processing unit 160 converts the analog image signal from which the synchronization signal is separated, into a digital signal by using an A/D conversion circuit or the like. The image processing unit 160 stores the converted digital image signal in the DRAM of the storage unit 120 for each frame as image data Data of RGB data. On the other hand, in a case of the digital format, the image processing unit 160 generates and transmits a clock signal PCLK and image data Data. Specifically, in a case where content is in a digital format, since the clock signal PCLK is output in synchronization with an image signal, generation of the vertical synchronization signal VSync and the horizontal synchronization signal HSync and A/D conversion of an analog image signal are not necessary. The image processing unit 160 may perform, on the image data Data stored in the storage unit 120, image processes such as a resolution conversion process, various color tone correction processes such as adjustment of luminance and color saturation, and a keystone correction process.

The image processing unit 160 transmits the generated clock signal PCLK, vertical synchronization signal VSync and horizontal synchronization signal HSync, and the image data Data stored in the DRAM of the storage unit 120 via the transmission units 51 and 52. The image data Data which is transmitted via the transmission unit 51 is also referred to as "right eye image data Data1", and the image data Data which is transmitted via the transmission unit 52 is also referred to as "left eye image data Data2". The transmission units 51 and 52 function as a transceiver which performs serial transmission between the control section 10 and the image display section 20.

The display control unit 190 generates control signals for control of the right display driving unit 22 and the left display driving unit 24. Specifically, the display control unit 190 individually controls right and left LCD control portions 211 and 212 to turn on and off driving of right and left LCDs 241 and 242, and right and left backlight control portions 201 and 202 to turn on and off driving of right and left backlights 221 and 222, by using the control signals, so as to control each of the right display driving unit 22 and the left display driving unit 24 to generate and emit image light. The display control unit 190 transmits control signals for the right LCD control portion 211 and the left LCD control portion 212 thereto, respectively, via the transmission units 51 and 52. The display control unit 190 transmits control signals for the right backlight control portion 201 and the left backlight control portion 202 thereto, respectively.

The sound processing unit 170 acquires an audio signal included in the content so as to amplify the acquired audio signal, and supplies the amplified audio signal to a speaker (not illustrated) of the right earphone 32 and a speaker (not illustrated) of the left earphone 34, coupled to the connection member 46. For example, in a case where the Dolby (registered trademark) is employed, the audio signal is processed, and thus different sounds of which, for example, frequencies are changed are output from the right earphone 32 and the left earphone 34.

The interface 180 couples the control section 10 to various external apparatuses OA which are supply sources of content. The external apparatuses OA may be, for example, a personal computer PC, a portable telephone terminal, and a gaming terminal. For example, a USE interface, a micro-USB interface, or a memory card interface may be used as the interface 180.

The image display section 20 includes the right display driving unit 22, the left display driving unit 24, the right light guide plate 261 as the right optical image display unit 26, the left light guide plate 262 as a left optical image display unit 28, and the nine-axis sensor 66.

The right display driving unit 22 includes a reception portion (Rx) 53, the right backlight (EL) control portion 201 and the right backlight (BL) 221 which function as a light source, the right LCD control portion 211 and the right LCD 241 which function as a display element, and a right projection optical system 251. The right backlight control portion 201, the right LCD control portion 211, the right backlight 221, and the right LCD 241 are also collectively simply referred to as an "image light generation unit".

The reception portion 53 functions as a receiver which performs serial transmission between the control section 10 and the image display section 20. The right backlight control portion 201 drives the right backlight 221 on the basis of an input control signal. The right backlight 221 is a light emitting body such as an LED or an electroluminescence element (EL). The right LCD control portion 211 drives the right LCD 241 on the basis of the clock signal PCLK, the vertical synchronization signal VSync, the horizontal synchronization signal HSync, and the right eye image data Data1, which are input via the reception portion 53. The right LCD 241 is a transmissive liquid crystal panel in which a plurality of pixels are arranged in a matrix.

The right projection optical system 251 is constituted by a collimator lens which converts image light emitted from the right LCD 241 into parallel beams of light flux. The right light guide plate 261 as the right optical image display unit 26 guides image light output from the right projection optical system 251 to the right eye RE of the user while reflecting the light along a predetermined optical path. The optical image display portion may use any type as long as a virtual image is formed in front of the eyes of the user by using image light, and may use, for example, a diffraction grating, and may use a transflective film.

The left display driving unit 24 has the same configuration as that of the right display driving unit 22. In other words, the left display driving unit 24 includes a reception portion (Rx) 54, the left backlight (BL) control portion 202 and the left backlight (BL) 222 which function as a light source, the left LCD control portion 212 and the left LCD 242 which function as a display element, and a left projection optical system 252. Detailed description thereof will be omitted.

Figure 8:
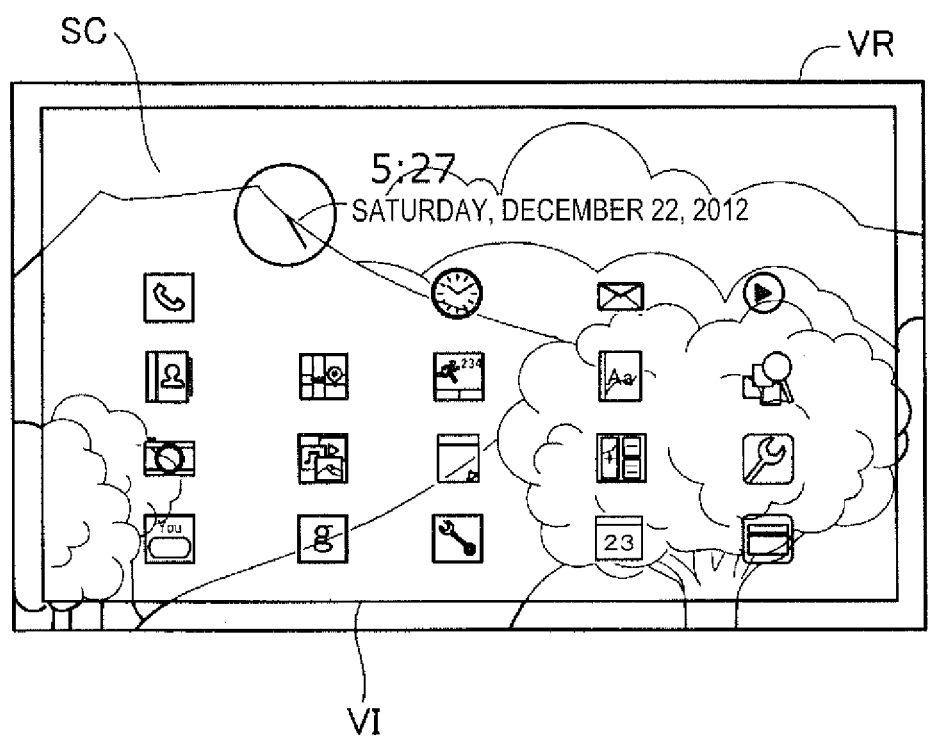
FIG. 8 is a diagram illustrating an example of a virtual image which is visually recognized by a user.

FIG. 8 is a diagram illustrating an example of a virtual image which is visually recognized by the user. As mentioned above, the image light which is guided to both eyes of the user of the HMD 100 forms an image on the retinas of the user, and thus the user visually recognizes a virtual image VI. In the example of FIG. 8, the virtual image VI is a standby screen of the OS 150 of the HMD 100. The user visually recognizes external scenery SC through the right optical image display unit 26 and the left optical image display unit 28. In this way, the user of the HMD 100 of the present embodiment can view the virtual image VI and the external scenery SC behind the virtual image VI in a portion where the virtual image VI is displayed in a visual field VR. In addition, the user can directly view the external scenery SC through the optical image display units in a portion where the virtual image VI is not displayed in the visual field VR.

A-2. UI Display Process

Figure 9:
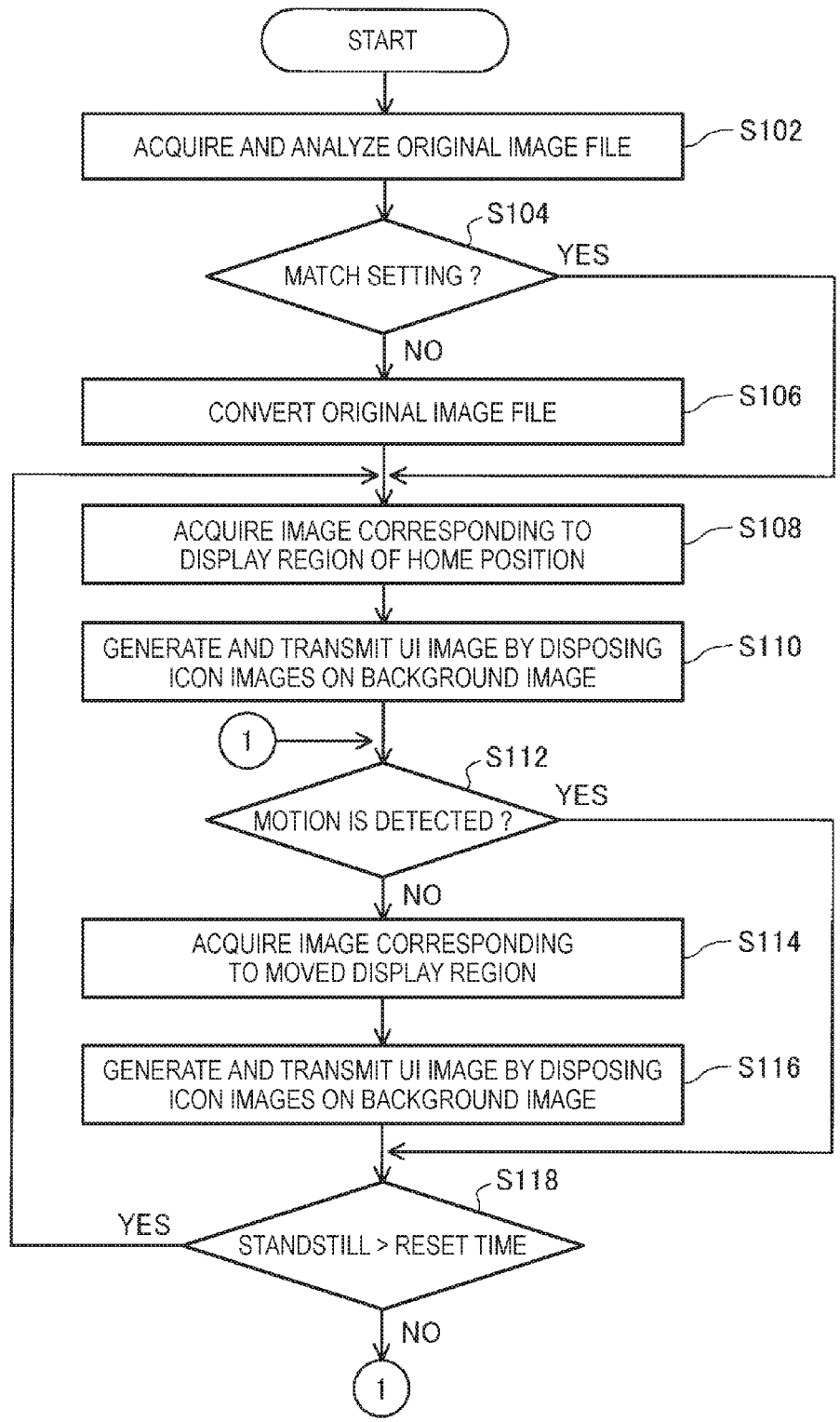
FIG. 9 is a flowchart illustrating procedures of a UI display process.

FIG. 9 is a flowchart illustrating procedures of a UI display process. The UI display process is a process in which the user visually recognizes a virtual image indicating an image in which a plurality of images (for example, icon images) used to operate the HMD 100 are superimposed on a background image, and the background image is changed according to a motion of the head of the user. The UI display process is started with a process starting request from the OS 150 or any application as a trigger.

In step S102, the UI display processing unit 142 acquires the original image file 124 stored in the storage unit 120. In step S104, the UI display processing unit 142 determines whether or not the original image file 124 matches a setting. Specifically, the UI display processing unit 142 refers to the image setting 122 stored in the storage unit 120. The UI display processing unit 142 analyzes the original image file 124 and determines whether or not the original image file 124 satisfies the "characteristic conditions regarding characteristics of a target image" of the image setting 122. If the original image file 124 satisfies all the characteristic conditions (step S104: YES), the UI display processing unit 142 causes the process to transition to step S108. In this case, in the subsequent processes, the UI display processing unit 142 sets an image indicated by the original image file 124 as a "target image" without conversion.

If the original image file 124 does not satisfy the characteristic conditions (step S104: NO), the UI display processing unit 142 converts the original image file 124 in step S106. Specifically, the UI display processing unit 142 converts (performs an enlargement or reduction process, a cutting process, or the like on) the original image file 124 to satisfy the "characteristic conditions regarding characteristic of a target image" of the image setting 122. During the conversion, the UI display processing unit 142 may perform a conversion process on the original image file 124 according to the "characteristic conditions regarding characteristic of a target image" of the image setting 122. In this case, the UI display processing unit 142 sets an image indicated by the converted original image file 124 as a "target image"

In step S108, the UI display processing unit 142 acquires an image of a portion corresponding to a display region of a home position from the target image. Specifically, the UI display processing unit 142 refers to the interlocking operation setting 126 stored in the storage unit 120. The UI display processing unit 142 virtually disposes the background image region WA (FIG. 6) at the home position coordinates (FIG. 6) on the target image. The UI display processing unit 142 extracts a target image of a portion which overlaps the disposed background image region WA, and sets the extracted image as a "background image".

In step S110, the UI display processing unit 142 generates and transmits an image (hereinafter, also referred to as a "UI image") in which icon images are disposed on the background image in step S108. Specifically, the UI display processing unit 142 refers to the icon information 128 stored in the storage unit 120. The UI display processing unit 142 superimposes the plurality of icon images 60a to 60d (FIG. 7) on the background image in step S108 at positions corresponding to the coordinates 70 of the icon images (FIG. 7), respectively. As mentioned above, the UI display processing unit 142 superimposes the plurality of icon images on the background image so as to generate the "UI image". Then, the UI display processing unit 142 transmits the generated UI image to the image processing unit 160. The image processing unit 160 which has received the UI image performs the above-described display process. As a result, image light which is guided to both eyes of the user of the HMD 100 forms an image on the retinas of the user, and thus the user of the HMD 100 can visually recognize a virtual image of the UI image. In other words, the HMD 100 can display the UI image.

In step S112, the UI display processing unit 142 determines whether or not a motion of the head of the user is detected by the nine-axis sensor 66.

Figure 10:
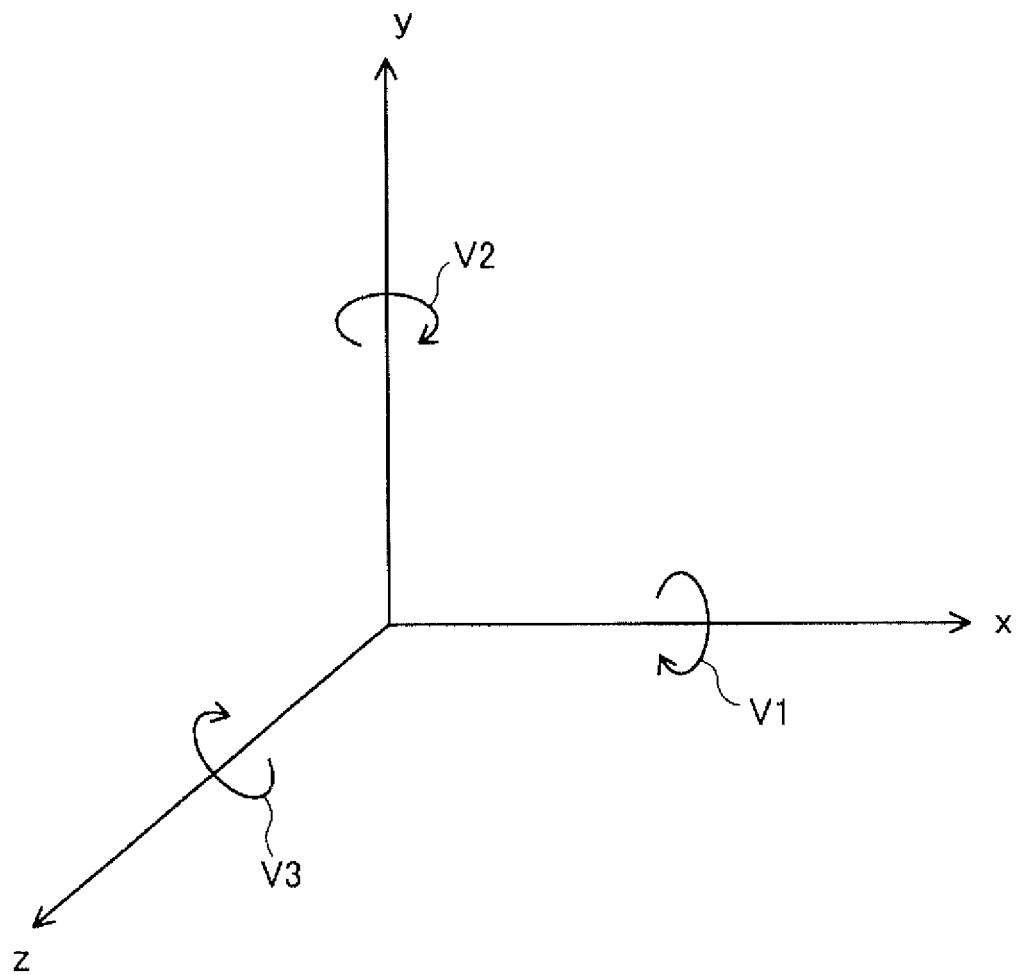
FIG. 10 is a diagram for explaining detection of a motion of a user's head.

FIG. 10 is a diagram for explaining detection of a motion of the head of the user. The nine-axis sensor 66 has a three-axis gyro (angular velocity) sensor embedded therein. The three-axis gyro sensor can detect angular velocity in each of three-axis directions of X, Y, and Z axes. In the present embodiment, angular velocity V1 of the X axis corresponds to a motion of the head in the vertical direction, angular velocity V2 of the Y axis corresponds to a motion of the head in the horizontal direction, and angular velocity V3 of the Z axis corresponds to a motion of the head in the oblique direction. A motion of the head in the oblique direction includes rotation, tilting, and the like. For this reason, for example, in a case where the user moves the head vertically, a change in the angular velocity V1 is detected; in a case where the user moves the head horizontally, a change in the angular velocity V2 is detected; and in a case where the user performs an operation of obliquely moving the head and putting the head on one side, a change in the angular velocity V3 is detected. The UI display processing unit 142 can identify whether or not the head is moved on the basis of whether or not the angular velocities V1 to V3 are changed, and can identify a movement amount of the head on the basis of values of the angular velocities V1 to V3.

If a motion of the head of the user is detected in step S112 of FIG. 9 (step S112: YES), the UI display processing unit 142 acquires an image corresponding to a display region after the motion from a target image in step S114. Specifically, the UI display processing unit 142 refers to the interlocking operation setting 126 stored in the storage unit 120.

Figure 11:
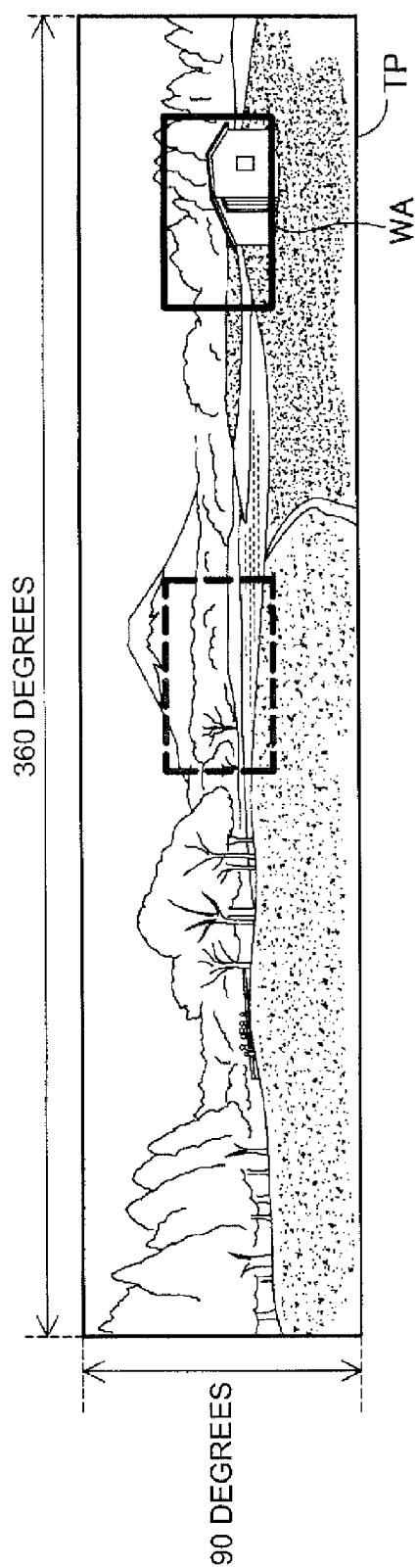
FIG. 11 is a diagram for explaining step S114 of the UI display process.

FIG. 11 is a diagram for explaining step S114 of the UI display process. As illustrated in FIG. 11, the UI display processing unit 142 moves a portion (that is, the background image region WA) extracted as a background image in the horizontal direction on the target image TP, according to the horizontal motion (the angular velocity V2) of the head which is detected with the home position coordinates (FIG. 6) as a reference. At this time, the UI display processing unit 142 determines an amount (movement amount) in which the background image region WA is moved, on the basis of the horizontal angle defined in the interlocking operation setting 126. In the above-described manner, content of the horizontal angle of the interlocking operation setting 126 is changed, and thus a process of the UI display processing unit 142 can be easily changed.

Figure 12:
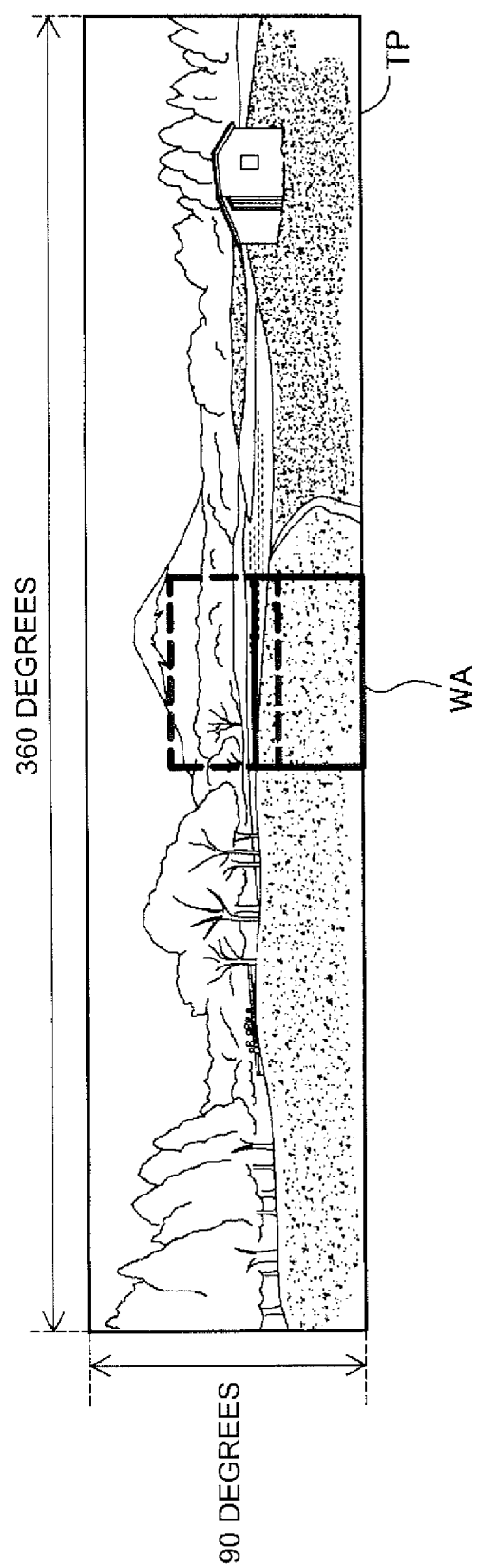
FIG. 12 is a diagram for explaining step S114 of the UI display process.

FIG. 12 is a diagram for explaining step S114 of the UI display process. As illustrated in FIG. 12, the UI display processing unit 142 moves the background image region WA in the vertical direction on the target image TP, according to the vertical motion (the angular velocity V1) of the head which is detected with the home position coordinates as a reference. At this time, the UI display processing unit 142 determines an amount (movement amount) in which the background image region WA is moved, on the basis of the vertical angle defined in the interlocking operation setting 126. In the above-described manner, content of the vertical angle of the interlocking operation setting 126 is changed, and thus a process of the UI display processing unit 142 can be easily changed.

Figure 13:
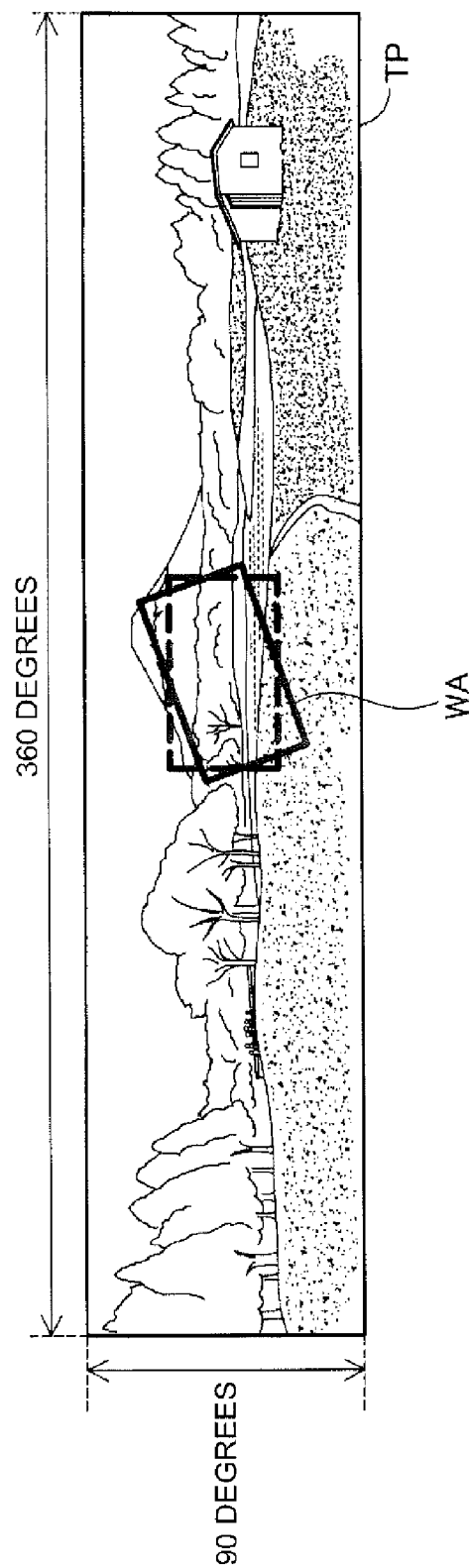
FIG. 13 is a diagram for explaining step S114 of the UI display process.

FIG. 13 is a diagram for explaining step S114 of the UI display process. As illustrated in FIG. 13, the UI display processing unit 142 inclines the background image region WA on the target image TP, according to the oblique motion (the angular velocity V3) of the head which is detected with the home position coordinates as a reference. The process, described with reference to FIG. 13, in which the background image region WA is inclined according to the oblique motion of the head, may be omitted.

After the processes described in FIGS. 11 to 13 are completed, the UI display processing unit 142 extracts the target image TP corresponding to a portion which overlaps the moved background image region WA, and sets the extracted images as a "background image".

In step S116 of FIG. 9, the UI display processing unit 142 generates and transmits a new UI image in which icon images are disposed on the background image in step S114. Specifically, the UI display processing unit 142 superimposes the plurality of icon images 60a to 60d (FIG. 7) on the background image in step S114 at positions corresponding to the coordinates 70 of the icon images (FIG. 7), respectively. As mentioned above, the UI display processing unit 142 superimposes the plurality of icon images on the new background image so as to generate the new "UI image".

Figure 14:
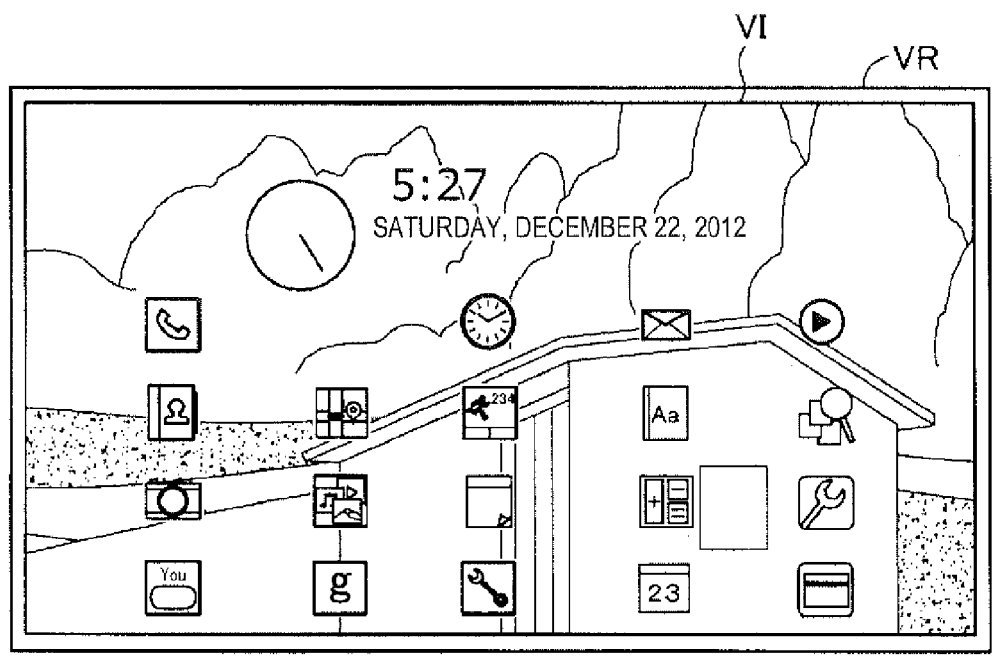
FIG. 14 is a diagram illustrating an example of a virtual image indicated by a UI image which is visually recognized by the user through the UI display process.

FIG. 14 is a diagram illustrating an example of a virtual image indicating a UI image which is visually recognized by the user through the UI display process. In step S116 of FIG. 9, the UI display processing unit 142 transmits the generated new UI image to the image processing unit 160. The image processing unit 160 which has received the UI image performs the above-described display process, and, as a result, the HMD 100 allows the user to visually recognize a virtual image VI indicating the new UI image as illustrated in FIG. 14. For convenience of illustration, the background is not illustrated in FIG. 14. Then, the UI display processing unit 142 causes the process to transition to step S118.

If a motion of the head of the user is not detected in step S112 of FIG. 9 (step S112: NO), the UI display processing unit 142 causes the process to transition to step S118.

In step S118, the UI display processing unit 142 determines whether or not a standstill time when a motion of the head is not detected exceeds the reset time of the interlocking operation setting 126 (step S118). If the standstill time is equal to or less than the reset time (step S118: NO), the UI display processing unit 142 causes the process to transition to step S112, and continuously monitors a motion of the head. On the other hand, if the standstill time exceeds the reset time (step S118: YES), the UI display processing unit 142 causes the process to transition to step S108 and returns the background image to the home position. In the above-described manner, even in a case where the background image is changed according to an unintentional motion of the user, the background image can be returned to the initial location (home position) with the standstill of the user as a trigger. The unintentional motion of the user indicates general motions of the user performed against the user's will, for example, a case where a third person addresses to the user and the user turns around, or a case where the user stumbles during movement.

As mentioned above, according to the head mounted display (the HMD 100) of the embodiment, the display processing unit (the UI display processing unit 142) causes the image display section 20 to form a virtual image VI indicating an image (UI image) in which a plurality of images (the icon images 60*a* to 60*d*) used to operate the head mounted display are superimposed on a background image, and thus the user visually recognizes the virtual image VI. For this reason, the display processing unit can provide an operation unit for operating the head mounted display to the user. Since the display processing unit changes a background image according to a motion of the head of the user, the user can have an immersive feeling into a virtual space due to the background image which is changed according to the motion of the head of the user. As a result, it is possible to provide a head mounted display which provides an operation unit for operating the head mounted display to a user and enables the user to have an immersive feeling into a virtual space.

According to steps S108 and S114 of the UI display process of the embodiment, the display processing unit (the UI display processing unit 142) extracts part of the target image TP from the target image TP having a region larger than a region (the background image region WA) of a background image, and sets the extracted region as a background image. In addition, the display processing unit changes a portion (the background image region WA) extracted as a background image from the target image TP according to a motion of the head of the user. Therefore, the display processing unit can cause a background image to be continuously changed, and thus the user can have a high immersive feeling.

According to step S114 of the UI display process of the embodiment, the display processing unit (the UI display processing unit 142) moves a portion (the background image region WA) extracted as a background image from the target image TP, in the horizontal direction, according to a horizontal motion (the angular velocity V2) of the head of the user, and moves a portion extracted as a background image from the target image TP, in the vertical direction, according to a vertical motion (the angular velocity V1) of the head of the user. Similarly, the display processing unit inclines a portion extracted as a background image from the target image TP according to an oblique motion (the angular velocity V3) of the head of the user. As mentioned above, the display processing unit changes a background image in tracking of a motion of the head of the user, and thus the user can have a high immersive feeling.

According to steps S104 and S106 of the UI display process of the embodiment, in a case where an original image (the original image file 124) which is a source of the target image TP does not satisfy the characteristic conditions (the size of an image file, the format of the image file and the size of an image of the image setting 122) regarding characteristics of a target image, the display processing unit (the UI display processing unit 142) converts the original image so as to generate the target image TP which satisfies the characteristic conditions. For this reason, characteristics of the target image TP used to generate a background image can be uniformized. Similarly, according to step S106 of the UI display process of the embodiment, the display processing unit converts an original image which is a source of the target image TP according to the generation conditions (the processed file naming rule, the conversion method and the additional image process of the image setting 122) regarding generation of a target image to generate the target image TP. For this reason, characteristics of the target image TP used to generate a background image can be uniformized.

B. Second Embodiment

In a head mounted display of a second embodiment, a description will be made of a configuration in which a background image is changed according to at least one of a visual line of a user, motions of the eyes, and an attitude of the user instead of a motion of the head of the user or along with the motion of the head of the user. Hereinafter, only configurations and operations different from those of the first embodiment will be described. In addition, in the drawings, constituent elements which are the same as those of the first embodiment are given the same reference numerals as in the above-described first embodiment, and detailed description thereof will be omitted.

B-1. Configuration of Head Mounted Display

Figure 15:
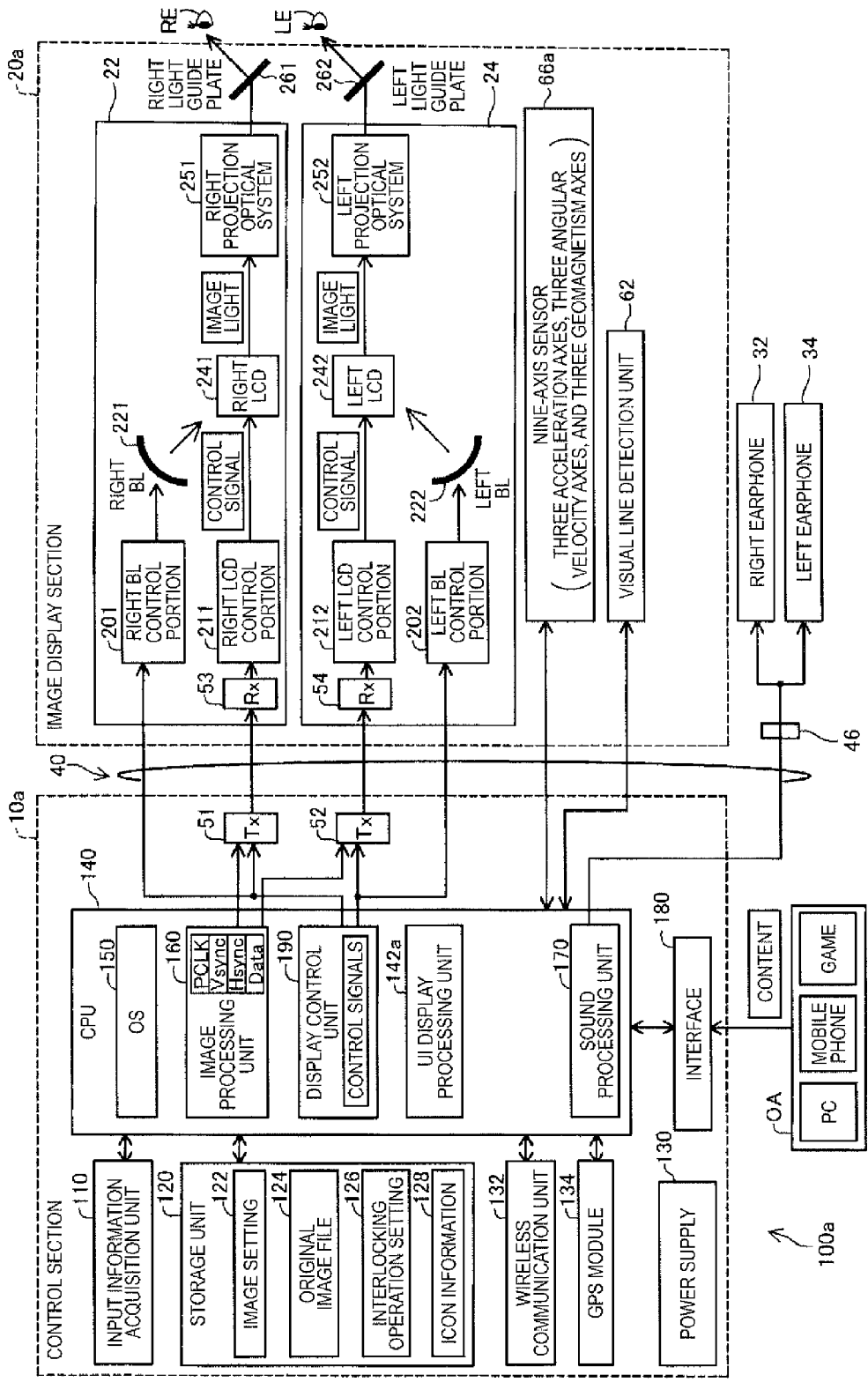
FIG. 15 is a functional block diagram illustrating a configuration of an HMD according to a second embodiment.

FIG. 15 is a functional block diagram illustrating a configuration of an HMD 100*a* of the second embodiment. A difference from the first embodiment illustrated in FIG. 2 is that a control section 10*a* is provided instead of the control section 10, and an image display section 20*a* is provided instead of the image display section 20. The control section 10*a* includes a UI display processing unit 142*a* instead of the UI display processing unit 142. In the UI display processing unit 142*a*, content of a UI display process to be executed is different from that of the first embodiment. Details thereof will be described later.

The image display section 20*a* includes a nine-axis sensor 66*a* instead of the nine-axis sensor 66, and further includes a visual line detection unit 62. The nine-axis sensor 66*a* is a motion sensor which detects acceleration (in three axes), angular velocity (in three axes), and geomagnetism (in three axes) in the same manner as in the first embodiment. The nine-axis sensor 66*a* of the second embodiment also functions as an "attitude detection unit" which detects an attitude of the user. Here, the attitude includes changes in velocity, acceleration, angular velocity and a direction of the user's body.

The visual line detection unit 62 is disposed at a position corresponding to the outer corner of the right eye when the user wears the image display section 20*a*. The visual line detection unit 62 includes a visible light camera. The visual line detection unit 62 captures an image of both eyes of the user wearing the HMD 100*a* by using the visible light camera, and analyzes the obtained eye image so as to detect a visual line direction of the user. In other words, the visual line detection unit 62 of the second embodiment functions as a "visual line detection unit" which detects a visual line of the user. The visual line detection unit 62 may detect a visual line direction of the user by using an infrared sensor instead of the visible light camera.

B-2. UI Display Process

Procedures of the UI display process of the second embodiment are the same as those of the first embodiment illustrated in FIG. 9. However, in a case where a background image is changed according to a visual line of the user, the UI display processing unit 142*a* determines whether or not a motion of a visual line of the user is detected by the visual line detection unit 62 in step S112 of FIG. 9. In a case where a background image is changed according to a visual line of the user, the disclosure of the "head of the user" in the description of FIG. 9 is replaced with a "visual line of the user". On the other hand, in a case where a background image is changed according to an attitude of the user, the UI display processing unit 142*a* determines whether or not a motion of an attitude of the user is detected by the nine-axis sensor 66*a* in step S112 of FIG. 9. In a case where a background image is changed according to an attitude of the user, the disclosure of the "head of the user" in the description of FIG. 9 is replaced with an "attitude of the user".

Also in the above-described manner, it is possible to achieve the same effect as in the first embodiment. The user can have a higher immersive feeling into a virtual space due to a background image which is changed according to a change in a visual line of the user or a change in an attitude of the user in addition to a motion of the head of the user.

C. Modification Examples

In the above-described embodiments, some of the constituent elements implemented in hardware may be implemented in software, and, conversely, some of the constituent elements implemented in software may be implemented in hardware. In addition, the following modifications may also occur.

Modification Example 1

In the above-described embodiments, a configuration of the HMD has been exemplified. However, any configuration of the HMD may be defined within the scope without departing from the spirit of the invention, and, for example, each configuration unit may be added, deleted, changed, or the like.

In the above-described embodiments, the allocation of the constituent elements to the control section and the image display section are only an example, and may employ various aspects. For example, the following aspects may be employed: (i) an aspect in which a processing function such as a CPU and a memory is mounted in the control section, and only a display function is mounted in the image display section; (ii) an aspect in which a processing function such as a CPU and a memory is mounted in both the control section and the image display section; (iii) an aspect in which the control section and the image display section are integrally formed (for example, an aspect in which the image display section includes the control section and functions as a wearable computer); (iv) an aspect in which a smart phone or a portable game machine is used instead of the control section; (v) an aspect in which the control section and the image display section are coupled to each other via a wireless signal transmission path such as a wireless LAN, infrared communication, or Bluetooth (registered trademark) so that the coupling unit (cords) is removed. In this case, the control section or the image display section may be supplied with power in a wireless manner.

For example, configurations of the control section and the image display section described in the embodiments may be arbitrarily changed. Specifically, in the above-described embodiments, the control section is provided with the transmission unit, and the image display section is provided with the reception unit. However, both of the transmission unit and the reception unit of the above-described embodiments have a bidirectional communication function, and thus can function as a transmission and reception unit. For example, some of the operation interfaces (the various keys, the track pad, and the like) included in the control section may be omitted. The control section may be provided with other operation interfaces such as an operation stick. The control section may be configured to be coupled to devices such as a keyboard or a mouse, and may receive an input from the keyboard or the mouse. For example, a secondary battery is used as the power supply, but the power supply is not limited to the secondary battery and may use various batteries. For example, a primary battery, a fuel cell, a solar cell, and a thermal cell may be used.

Figure 16A:
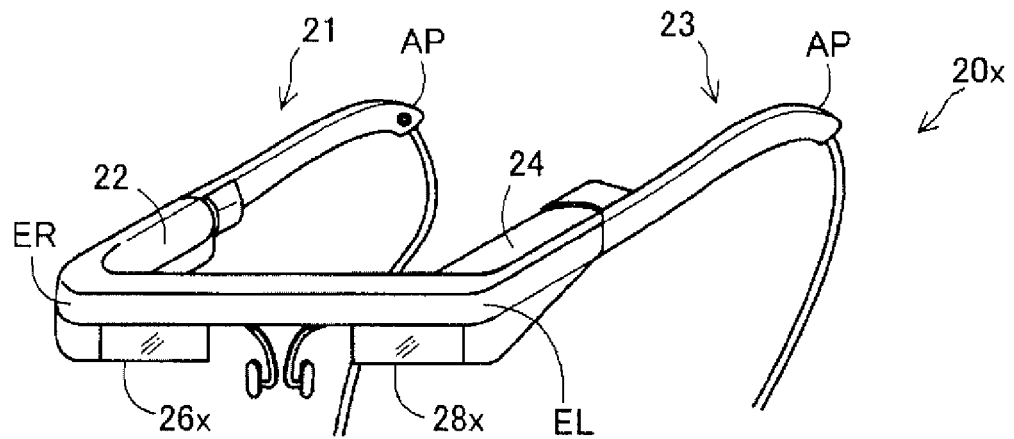
FIGS. 16A and 16B are diagrams illustrating exterior configurations of HMDs in a modification example.
Figure 16B:
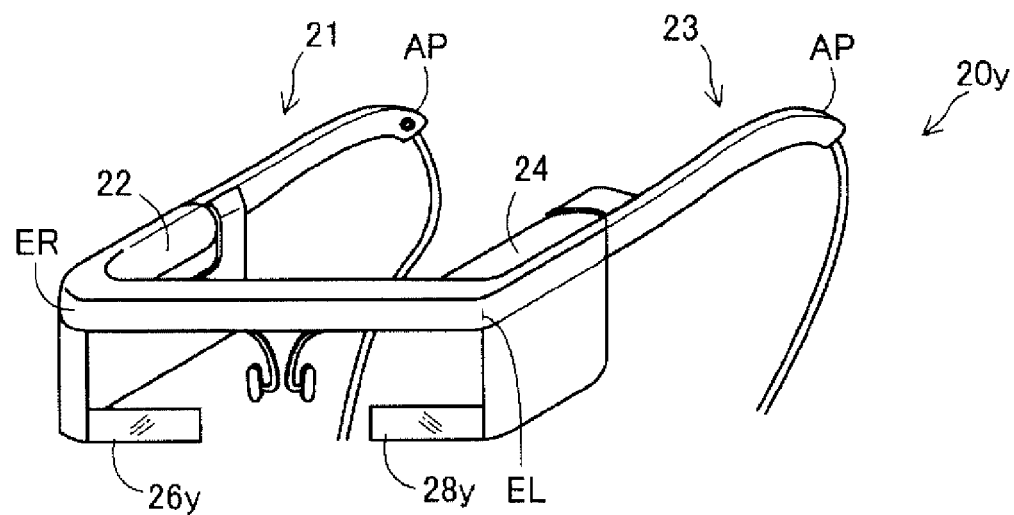

FIGS. 16A and 16B are diagrams illustrating exterior configurations of HMDs in a modification example. In an example of FIG. 16A, an image display section 20*x* includes a right optical image display unit 26*x* instead of the right optical image display unit 26 and a left optical image display unit 28*x* instead of the left optical image display unit 28. The right optical image display unit 26*x* and the left optical image display unit 28*x* are formed to be smaller than the optical members of the above-described embodiments, and are disposed on the obliquely upper side of the right eye and the left eye of the user when the HMD is mounted. In an example of FIG. 16B, an image display section 20*y* includes a right optical image display unit 26*y* instead of the right optical image display unit 26 and a left optical image display unit 28*y* instead of the left optical image display unit 28. The right optical image display unit 26*y* and the left optical image display unit 28*y* are formed to be smaller than the optical members of the above-described embodiments, and are disposed on the obliquely lower side of the right eye and the left eye of the user when the HMD is mounted. As mentioned above, the optical image display units have only to be disposed near the eyes of the user. Any size of the optical member forming the optical image display units may be used, and the HMD may be implemented in an aspect in which the optical image display units cover only part of the eyes of the user; in other words, the optical image display units do not completely cover the eyes of the user.

For example, description has been made that the respective processing units (the image processing unit, the display control unit, and the like) included in the control section are implemented by the CPU developing a computer program stored in the ROM or the hard disk on the RAM and executing the program. However, these function units may be configured using an application specific integrated circuit (ASIC) which is designed for implementing each of the corresponding functions.

For example, the HMD is a binocular transmission type HMD, but may be a monocular HMD. In addition, the HMD may be a non-transmissive head mounted display through which external scenery is blocked from being transmitted in a state in which the user wears the HMD, and may be configured as a video see-through type in which a camera is mounted on the non-transmissive HMD. As an image display section, instead of the image display section which is worn such as glasses, a typical flat display device (a liquid crystal display, a plasma display panel, an organic EL display, or the like) may be used. Also in this case, coupling between the control section and the image display section may be performed via a wired signal transmission path, and may be performed via a wireless signal transmission path. In the above-described manner, the control section may used as a remote controller of a typical flat display device. In addition, as an image display section, instead of the image display section which is worn such as glasses, other types of image display sections such as an image display section which is worn such as a cap, may be employed. The earphone may employ an ear-mounted type or a head band type, or may be omitted. For example, a head-up display (HUD) may be configured to be mounted in a vehicle such as an automobile or an airplane, and other transportation. For example, the HMD may be configured to be built in a body protection tool such as a helmet.

For example, in the above-described embodiments, the image light generation unit is configured using the backlight, the backlight control portion, the LCD, and the LCD control portion. However, the above aspect is only an example. The image light generation unit may include a configuration unit for implementing other types along with this configuration unit or instead of this configuration unit. For example, the image light generation unit may include an organic electroluminescence (EL) display and an organic EL controller. For example, the image light generation unit may use a digital micromirror device or the like instead of the LCD. For example, the invention is applicable to a laser retinal projective head mounted display.

Modification Example 2

In the above-described embodiments, an example of the UI display process has been described. However, the procedures of the process described in the embodiments are only an example, and various modifications may occur. For example, some steps may be omitted, and other steps may be added. In addition, an order of executed steps may be changed.

For example, in step S102, the UI display processing unit may select one original image file from among a plurality of original image files on the basis of a predetermined selection criterion. The predetermined selection criterion may include, for example, selection based on an operation for designating an original image file, selection based on an ID of a user who logs in to an OS, and selection based on the current time. If the selection based on the ID of a user is implemented, selection of a different original image file and generation of a different target image for each user are performed, and thus a different image may be used as a background image in a UI image for each user. If the selection based on the current time is implemented, selection of a different original image file and generation of a different target image are performed depending on a point of time, and thus an image at that time may be used as a background image in a UI image. As a result, the user can have a high immersive feeling.

For example, the UI display processing unit performs analysis and conversion of an original image file in steps S102 to S106. However, the UI display processing unit may omit either the analysis or the conversion of an original image. For example, the UI display processing unit may not analyze the original image and uniformly convert the original image so as to generate a target image.

For example, in steps S102 to S106, the UI display processing unit performs analysis and conversion of an original image file by using the characteristic conditions regarding characteristics of a target image and the generation conditions regarding generation of a target image which are stored in advance. However, the UI display processing unit may perform the analysis and the conversion of an original image file without using the characteristic conditions and the generation conditions or without using either the characteristic conditions or the generation conditions.

For example, in steps S112 and S114, the UI display processing unit may change a background image by using all of a motion of the head of the user, a motion of a visual line, and a motion of an attitude. In addition, in steps S112 and S114, the UI display processing unit may change a background image by using conditions other than all of a motion of the head of the user, a motion of a visual line, and a motion of an attitude. From the viewpoint of giving a higher immersive feeling to the user, other conditions preferably include a motion of part of the user's body.

For example, in steps S112 and S114, the UI display processing unit detects horizontal, vertical and oblique motions of the head of the user by using the multi-axis (specifically, three axes of X, Y, and Z), and change a background image on the basis of a detected result. However, the UI display processing unit may detect a motion of the head of the user by using a single-axis or two-axis sensor.

For example, in step S118, the UI display processing unit may return a background image to a home position by using conditions other than the reset time elapse. The conditions other than the reset time include, for example, an instruction from the user, and activation of a specified application.

Modification Example 3

In the above-described embodiments, each configuration of the image setting, the original image, the interlocking operation setting, and the icon information has been exemplified. However, the specific examples in the above-described embodiments are only an example, and items included in each setting and information piece are arbitrarily added, deleted, and changed. The image setting, the interlocking operation setting, and the icon information may be provided by devices other than the storage device built into the HMD, for example, a portable storage device.

For example, an original image may be a plurality of image files. In this case, the UI display processing unit may combine the plurality of image files together and may generate a "target image" from the combined image. Instead of icon images included in the icon information, characters, symbols, pictographs, and the like may be used.

Modification Example 4

The invention is not limited to the above-described embodiments or modification examples, and may be implemented using various configurations within the scope without departing from the spirit thereof. For example, the embodiments corresponding to technical features of the respective aspects described in the summary of Invention and the technical features in the modification examples may be exchanged or combined as appropriate in order to solve some or all of the above-described problems, or in order to achieve some or all of the above-described effects. In addition, if the technical feature is not described as an essential feature in the present specification, the technical feature may be deleted as appropriate.

The entire disclosure of Japanese Patent Application No. 2014-065100, filed Mar. 27, 2014 is expressly incorporated by reference herein.

What is claimed is:

1. A head mounted display which allows a user to visually recognize a virtual image, comprising:
   an image display unit that enables the user to visually recognize the virtual image;
   a display processing unit that causes the image display unit to form the virtual image indicating a plurality of images used to operate the head mounted display and a background image; and
   a motion detection unit that detects a motion of the head of the user,
   wherein the display processing unit changes the background image according to a motion of the head of the user, extracts part of a target image from the target image having a region larger than a region of the background image, sets the extracted target image as the background image, and changes the background image by changing a portion extracted from the target image according to the motion of the head of the user, and
   wherein, upon movement of the head of the user by a predetermined movement amount, the display processing unit causes the background image to move an amount corresponding to the predetermined movement amount.

2. The head mounted display according to claim 1, wherein the display processing unit
   moves a portion extracted as the background image from the target image in a horizontal direction according to a detected horizontal motion of the head of the user, and
   moves a portion extracted as the background image from the target image in a vertical direction according to a detected vertical motion of the head of the user.

3. The head mounted display according to claim 2, further comprising:
   a storage unit that stores in advance a movement amount of the head of the user in the horizontal direction relative to a horizontal size of the target image and a movement amount of the head of the user in the vertical direction relative to a vertical size of the target image,
   wherein the display processing unit determines a portion to be extracted as the background image from the target image, on the basis of a detected horizontal motion of the head of the user, the movement amount in the horizontal direction, a detected vertical motion of the head of the user, and the movement amount in the vertical direction.

4. The head mounted display according to claim 2, wherein the display processing unit inclines a portion extracted as the background image from the target image according to an oblique motion of the head of the user.

5. The head mounted display according to claim 1, wherein the display processing unit changes the target image according to the current time.

6. The head mounted display according to claim 1, further comprising:
   a storage unit that stores characteristic conditions regarding characteristics of the target image in advance,
   wherein the display processing unit
   acquires an original image which is a source of the target image;
   generates the target image which satisfies the characteristic conditions by converting the original image in a case where the acquired original image does not satisfy the characteristic conditions; and
   sets the original image as the target image without conversion in a case where the acquired original image satisfies the characteristic conditions.

7. The head mounted display according to claim 1, further comprising:
   a storage unit that stores generation conditions regarding generation of the target image in advance,
   wherein the display processing unit
   acquires an original image which is a source of the target image; and
   generates the target image by converting the acquired original image according to the generation conditions.

8. The head mounted display according to claim 1, further comprising:
   a visual line detection unit that detects a visual line of the user,
   wherein the display processing unit changes the background image according to a visual line of the user.

9. The head mounted display according to claim 1, further comprising:
   an attitude detection unit that detects an attitude of the user,
   wherein the display processing unit changes the background image according to an attitude of the user.

10. The head mounted display according to claim 1, wherein the plurality of images include at least icon images in the head mounted display.

11. A control method for a head mounted display, comprising:
    enabling a user of the head mounted display to visually recognize a virtual image;
    forming the virtual image indicating a plurality of images used to operate the head mounted display and a background image; and
    detecting a motion of the head of the user,
    wherein, in the forming of the virtual image, the background image is changed according to a motion of the head of the user;
    extracting part of a target image from the target image having a region larger than a region of the background image, and setting the extracted target image as the background image;
    changing the background image by changing a portion extracted from the target image according to a motion of the head of the user; and
    upon movement of the head of the user by a predetermined movement amount, causing the background image to move an amount corresponding to the predetermined movement amount.

* * * * *